United States Patent
Hecht

(10) Patent No.: US 12,134,135 B2
(45) Date of Patent: Nov. 5, 2024

(54) SYMMETRIC CUTTING TOOL INCLUDING CUTTING BLADE AND TOOL HOLDER PROVIDED WITH CONVERGING ABUTMENT SURFACES

(71) Applicant: ISCAR, LTD., Tefen (IL)

(72) Inventor: Gil Hecht, Nahariya (IL)

(73) Assignee: ISCAR, LTD., Tefen (IL)

( * ) Notice: Subject to any disclaimer, the term of this patent is extended or adjusted under 35 U.S.C. 154(b) by 139 days.

(21) Appl. No.: 17/855,858

(22) Filed: Jul. 1, 2022

(65) Prior Publication Data

US 2024/0001455 A1    Jan. 4, 2024

(51) Int. Cl.
*B23B 27/16* (2006.01)
*B23B 29/12* (2006.01)

(52) U.S. Cl.
CPC .......... *B23B 27/1611* (2013.01); *B23B 29/12* (2013.01); *B23B 2205/12* (2013.01)

(58) Field of Classification Search
CPC ....... B23B 29/046; B23B 29/06; B23B 29/12; B23B 2200/165; B23B 2200/3627; B23B 2205/10; B23B 2205/12; B23B 2210/08
See application file for complete search history.

(56) References Cited

U.S. PATENT DOCUMENTS

| | | |
|---|---|---|
| 3,551,977 A | 1/1971 | Novkov |
| 3,815,454 A | 6/1974 | Knott |
| 4,938,641 A | 7/1990 | Maier |
| 7,217,068 B2 | 5/2007 | Oettle |
| 2010/0316454 A1* | 12/2010 | Zitzlaff ............... B23B 27/1666 407/99 |
| 2015/0063929 A1* | 3/2015 | Hecht ................... B23B 29/043 407/67 |
| 2022/0212269 A1 | 7/2022 | Miyazawa |

FOREIGN PATENT DOCUMENTS

| | | |
|---|---|---|
| CN | 1757471 A | 4/2006 |
| DE | 3434653 A1 | 4/1985 |
| DE | 3816931 A1 | 12/1988 |
| EP | 2 745 963 A1 | 6/2014 |
| JP | 2012-218083 A | 11/2012 |
| JP | 2018-149653 | 9/2018 |
| JP | 6961151 B1 | 11/2021 |

OTHER PUBLICATIONS

International Search Report dated Sep. 19, 2023, issued in PCT counterpart application No. PCT/IL2023/050594.
Written Opinion dated Sep. 19, 2023, issued in PCT counterpart application No. PCT/IL2023/050594.

* cited by examiner

*Primary Examiner* — Alan Snyder
(74) *Attorney, Agent, or Firm* — Womble Bond Dickinson (US) LLP

(57) ABSTRACT

A cutting tool having a cutting blade, a cutting insert and a tool holder. The cutting blade has converging peripheral blade abutment sub-surfaces exhibiting mirror symmetry about a second symmetry plane. The tool holder has a blade pocket with converging pocket abutment walls exhibiting mirror symmetry about a holder symmetry plane. The cutting tool can be assembled and utilized in four different configurations in a turret.

21 Claims, 8 Drawing Sheets

SYMMETRIC CUTTING TOOL INCLUDING CUTTING BLADE AND TOOL HOLDER PROVIDED WITH CONVERGING ABUTMENT SURFACES

FIELD OF THE INVENTION

The subject matter of the present application relates to turning cutting tools, in general, and to tool holders having separable blades carrying cutting inserts in grooving and parting off metal machining, in particular.

BACKGROUND OF THE INVENTION

In the field of metal cutting, blades having a converging peripheral surface and a symmetry about a plane are known. For example, such a cutting blade is disclosed in U.S. Pat. No. 3,551,977 and DE 3,816,931.

Also known are cutting tools for turning metal machining operations usable for left-hand and right-hand cutting operations and for machining of a workpiece which rotates about its axis in two directions. For example, such tools are disclosed in U.S. Pat. No. 3,815,454.

It is an object of the subject matter of the present application to provide a symmetric cutting tool having four possible assembly configurations for various machining operations.

SUMMARY OF THE INVENTION

In accordance with a first aspect of the subject matter of the present application there is provided a cutting blade extending along a central blade axis defining opposite forward and rearward blade directions; the cutting blade having first and second symmetry planes perpendicular to one another, each containing the central blade axis; the cutting blade comprising: opposite first and second blade side surfaces extending along, and on opposite sides of, the first symmetry plane; a blade peripheral surface connecting the first and second blade side surfaces; a blade cutting portion comprising a first insert seat; and a blade fastening portion extending from the blade cutting portion in the rearward blade direction; the blade peripheral surface comprising: opposite top and bottom blade surfaces extending along, and on opposite sides of, the second symmetry plane; a forwardly facing forward blade surface extending between the top and bottom blade surfaces; and a rearward blade end opposite the forward blade surface; at the blade fastening portion: the top blade surface comprises a first peripheral blade abutment sub-surface; the bottom blade surface comprises a second peripheral blade abutment sub-surface; the first and second blade side surfaces comprise, respectively, first and second blade side abutment sub-surfaces; and a first blade bore opens out to the first and second blade side abutment sub-surfaces; wherein: the first and second peripheral blade abutment sub-surfaces converge in the rearward blade direction at a first taper angle $\beta 1$ and exhibit a mirror symmetric angle about the first and second symmetry planes.

In accordance with a second aspect of the subject matter of the present application there is provided a tool holder extending along a holder longitudinal axis defining opposite forward and rearward holder directions; the tool holder having a holder symmetry plane containing the holder longitudinal axis; the tool holder comprising: opposing upper and lower holder surfaces extending along, and on opposite sides of the holder symmetry plane; opposing first and second side holder surfaces extending along the holder longitudinal axis and connecting the upper and lower holder surfaces; a front holder surface connecting the upper and lower holder surfaces and the first and second side holder surfaces; and a blade pocket recessed in the first side holder surface and opening out to the front holder surface; the blade pocket comprising: a pocket base abutment surface transverse to the holder symmetry plane; a first holder bore opening out to the pocket base abutment surface; and a pocket peripheral surface extending from the pocket base abutment surface towards the first side holder surface and comprising: first and second pocket abutment walls located on opposite sides of the holder symmetry plane and converging in the rearward holder direction; wherein: the first and second pocket abutment walls exhibit a mirror symmetric angle about the holder symmetry plane; and the upper and lower holder surfaces exhibit a mirror symmetric angle about the holder symmetry plane.

In accordance with a third aspect of the subject matter of the present application there is provided a cutting tool comprising: a tool holder in accordance with the second aspect; a fastening member; a cutting blade in accordance with the first aspect; and a cutting insert releasably secured to the first insert seat of the cutting blade; the cutting blade is releasably secured to the tool holder by the fastening member passing through the first blade bore and engaging the first holder bore; wherein: the mirror symmetric angles of the cutting blade and the tool holder are configured to facilitate the cutting blade to be secured to the tool holder in both of the following two configurations, namely: a first configuration where the second blade side abutment sub-surface abuts the pocket base abutment surface and the first and second peripheral blade abutment sub-surfaces respectively abut the first and second pocket abutment walls; and a second configuration where the first blade side abutment sub-surface abuts the pocket base abutment surface and the first and second peripheral blade abutment sub-surfaces respectively abut the second and first pocket abutment walls.

Any of the aspects above can be advantageous for one or more of the following reasons:

a. A cutting blade with symmetry as described above can be used in varying configurations, allowing more adaptability to the needs of different machining operations.

b. The cutting blade and/or the tool holder is compact, which is particularly beneficial in some parting operations and, for example swiss machining.

c. The cutting blade and/or the tool holder is particularly stable (for example by the bores thereof being spaced apart, or the blade cutting portion being relatively short, or the prismatic dovetail arrangement, etc.).

d. A tool holder as described above can accommodate a cutting blade as described above in different configurations, while the tool holder itself can be used in varying configurations when attached to a turret. This allows greater adaptability of the tool holder to the needs of differing machining operations.

e. A cutting tool as described above can be placed in four different configurations in a turret, allowing the cutting tool to be used in varying machining operations with differing limitations.

f. Unlike a slidable blade, the single position pocket can allow the blade to be removed and quickly replaced (even flipped).

It is understood that the above-said is a summary, and that features described hereinafter may be applicable in any combination to the subject matter of the present application, for example, any of the following features may be applicable to the cutting blade and/or the tool holder and/or the cutting tool.

In a side view of the cutting blade, at the rearward blade end, the first and second blade abutment sub-surfaces may merge tangentially with an arcuate terminal end surface having a first radius of curvature. Such an exemplified geometry is preferable for shortening the length of the cutting blade while also allowing the first blade bore to be placed as rearwardly as possible.

A cutting portion longitudinal extent Dc, measured along the central blade axis at the blade cutting portion, and a fastening portion longitudinal extent Df, measured along the central blade axis at the blade fastening portion, may fulfil the condition: Dc≤Df Such a condition ensures that the cutting blade is not over-extended during machining operations. Stated differently, reduced overhang of the cutting blade results in improved stability (less vibrations).

Preferably, only the blade fastening portion contacts the blade cutting portion. While it is typically preferable for the blade to have additional support of the blade cutting portion by the tool holder contacting the blade cutting portion, it was chosen in the preferred embodiments to forgo this support in order to achieve greater versatility of the tool holder.

The first blade bore may comprise a first bore double-ended cone tapering away from the first and second blade side surfaces toward the first symmetry plane. It is preferable that fastening members securing the cutting blade to the tool holder do not protrude beyond the cutting blade. To that end, an exemplified solution is having the first blade bore with a double-ended cone geometry.

At the blade fastening portion, the cutting blade may further comprise: a second blade bore located forwardly of the first blade bore and opening out to the first and second blade side surfaces; and a third blade bore located forwardly of the first blade bore and opening out to the first and second blade side surfaces; the first, second and third bore double-ended cones exhibit mirror symmetry about the first symmetry plane.

The first and second peripheral blade abutment sub-surfaces may exhibit mirror symmetry about the first and second symmetry planes.

At the blade fastening portion, the cutting blade may exhibit mirror symmetry about the first and second symmetry planes.

The first peripheral blade abutment sub-surface may comprise a first blade prism; the second peripheral blade abutment sub-surface may comprise a second blade prism; and the first and second blade prisms exhibit a mirror symmetric angle about the first and second symmetry planes.

The first insert seat may comprise an insert support surface extending transversely to the second symmetry plane; and, at the blade fastening portion, the blade peripheral surface may further comprise a rearward facing pair of blade stopper surfaces adjacent to the first and second peripheral blade abutment sub-surfaces. For Y-axis cutting tools, as will be discussed below, such support is especially advantageous, due to the direction of the cutting forces during machining operations which are now directed more towards the pair of blade stopper surfaces than in X-axis tools.

At the blade fastening portion, the blade peripheral surface may further comprise: third and fourth peripheral blade abutment sub-surfaces located on opposite sides of the second symmetry plane and converging in the rearward blade direction at a second taper angle, the first and third abutment sub-surfaces being on the same side of the second symmetry plane and the second and fourth abutment sub-surfaces being on the same side of the second symmetry plane; a first blade transition surface located between the first and third peripheral blade abutment sub-surfaces; and a second blade transition surface located between the second and fourth peripheral blade abutment sub-surfaces. A blade embodiment having such a geometry is especially desirable in cutting operations with limited room, where the cutting blade is to be made as small as possible. In such case, the abutment of a cutting blade according to the first aspect and a tool holder may be lacking stability due to insufficient or near insufficient overlap between the cutting blade and the tool holder (provided the first taper angle is not changed). To remedy this, the cutting blade can be structured as described above, having a greater overlap with a tool holder and thus a better abutment (i.e. having first and second taper angles). In said embodiment, the first taper angle and the second taper angle are preferably identical to one another, but it is also feasible that they may differ from one another.

In a side view of the cutting blade, at the rearward blade end, the third and fourth blade abutment sub-surfaces may merge with a rearward facing flat surface which is perpendicular to the central blade axis. The geometry exhibited herein may shorten the length of the cutting blade, relative to the arcuate terminal end surface having a first radius of curvature. A shorter cutting blade may be preferred in certain cutting operations.

The first taper angle $\beta 1$ may satisfy the following condition: $10° \leq \beta 1 \leq 80°$.

The first taper angle $\beta 1$ may further satisfy the following condition: $20° \leq \beta 1 \leq 60°$.

The first taper angle $\beta 1$ may further satisfy the following condition: $25° \leq \beta 1 \leq 40°$. A small first taper angle $\beta 1$ is less preferred as it may cause the blade to self-lock to the tool holder, whereas a large first taper angle $\beta 1$ may provide insufficient support for the cutting blade (for example in the direction of X-axis cutting operations). Thus, it was found that the ranges specified above are most advantageous, specifically $25° \leq \beta 1 \leq 40°$.

Regarding the tool holder, some preferred features are as follows.

The tool holder may exhibit mirror symmetry about the holder symmetry plane.

The pocket peripheral surface may further comprise: third and fourth pocket abutment walls located on opposite sides of the holder symmetry plane and converging in the rearward holder direction; a first holder transition surface located between the first and third pocket abutment walls; and a second holder transition surface located between the second and fourth pocket abutment walls. Stated differently, such a tool holder is complimentary to some of the cutting blade embodiments, as described above.

The first blade side surface and second blade side surfaces may be flush, or recessed relative to, the first side holder surface in a direction perpendicular to the first symmetry plane. This further allows the cutting tool to complete close-to-shoulder machining operations.

At the blade fastening portion, the cutting blade may further comprise: a second blade bore located forwardly of the first blade bore and opening out to the first and second blade side surfaces; and a third blade bore located forwardly of the first blade bore and opening out to the first and second blade side surfaces; the blade pocket further comprises: a second holder bore located forwardly of the first holder bore; and a third holder bore located forwardly of the first holder bore; the first, second and third blade bores exhibit mirror symmetry about the second symmetry plane; and the first, second and third holder bores exhibit mirror symmetry about the holder symmetry plane.

At the blade fastening portion, the blade peripheral surface may further comprise a rearward facing pair of blade stopper surfaces adjacent to the first and second peripheral blade abutment sub-surfaces; the blade pocket further comprises a forwardly facing pair of holder stopper surfaces adjacent to the first and second pocket abutment walls; and the pair of blade stopper surfaces abut against the pair of holder stopper surfaces.

BRIEF DESCRIPTION OF THE FIGURES

For a better understanding of the present application and to show how the same may be carried out in practice, reference will now be made to the accompanying drawings, in which:

FIG. 9b is a side view of the cutting blade of FIG. 9a;

FIG. 9c is a side view of the tool holder of FIG. 9a;

FIG. 10b is a side view of the cutting blade of FIG. 10a; and

FIG. 10c is a side view of the tool holder of FIG. 10a.

Figure 1:
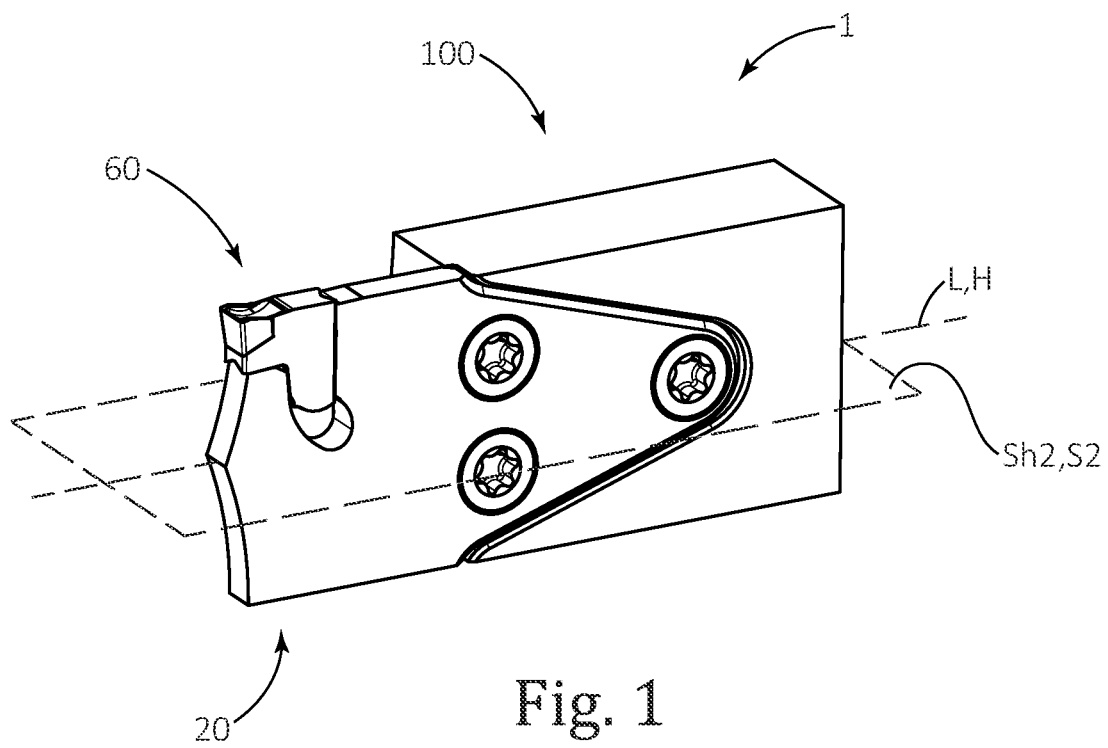
FIG. 1 is a perspective view of a cutting portion of a cutting tool in accordance with an embodiment of the present invention (it should be understood that the cutting portion will typically have a shank, but since this is a standard component it is not shown or described and hereinafter the words "cutting portion" may be omitted, and only "cutting tool" or "tool holder" used even though it is understood that said shank is implied)

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Attention is first drawn to FIGS. 1 to 3d, where a cutting tool 1 is shown. The cutting tool 1 includes a cutting blade 20 releasably secured to a tool holder 100 and a cutting insert 60 releasably secured to the cutting blade 20.

Figure 7:
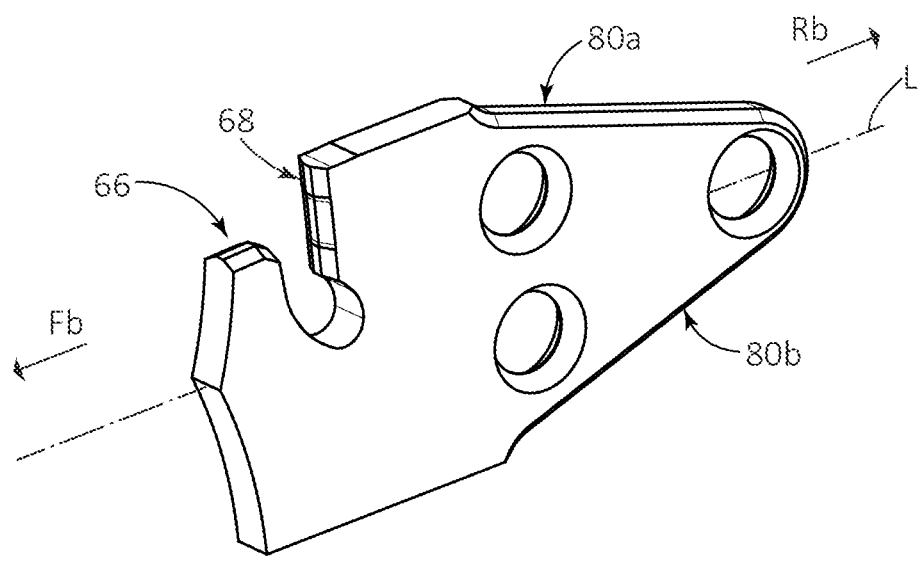
FIG. 7 is a perspective view of a cutting blade in accordance with an embodiment of the present invention.
Figure 8A:
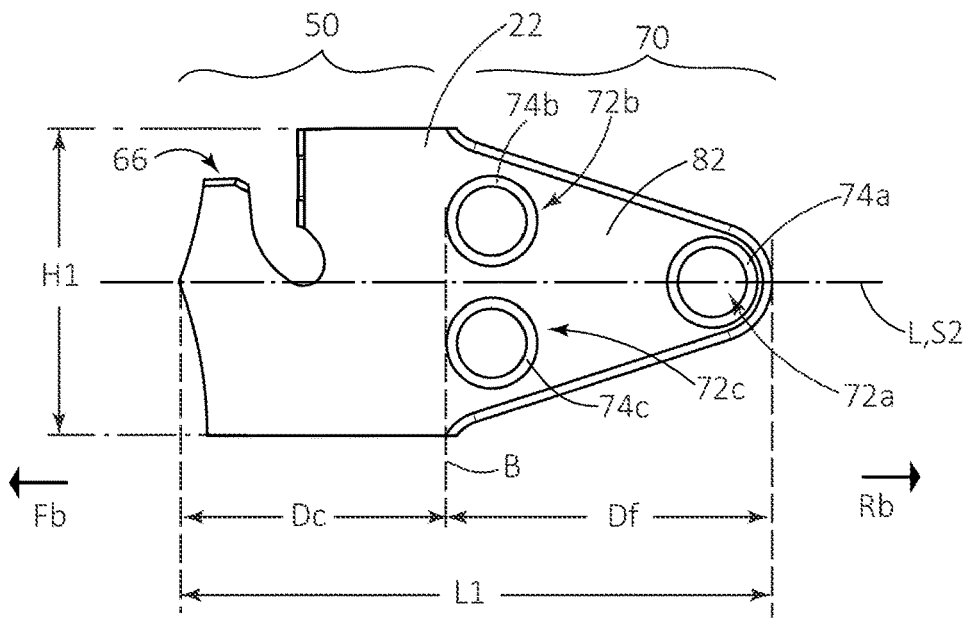
FIG. 8a is a first side view of the cutting blade of FIG. 7.
Figure 8B:
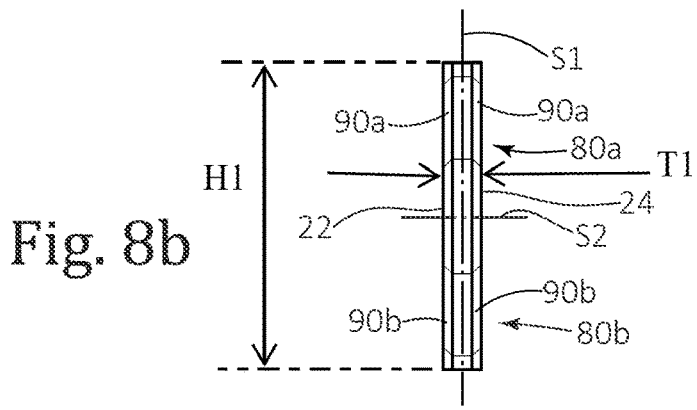
FIG. 8b is rear end view of the cutting blade of FIG. 7.
Figure 8C:
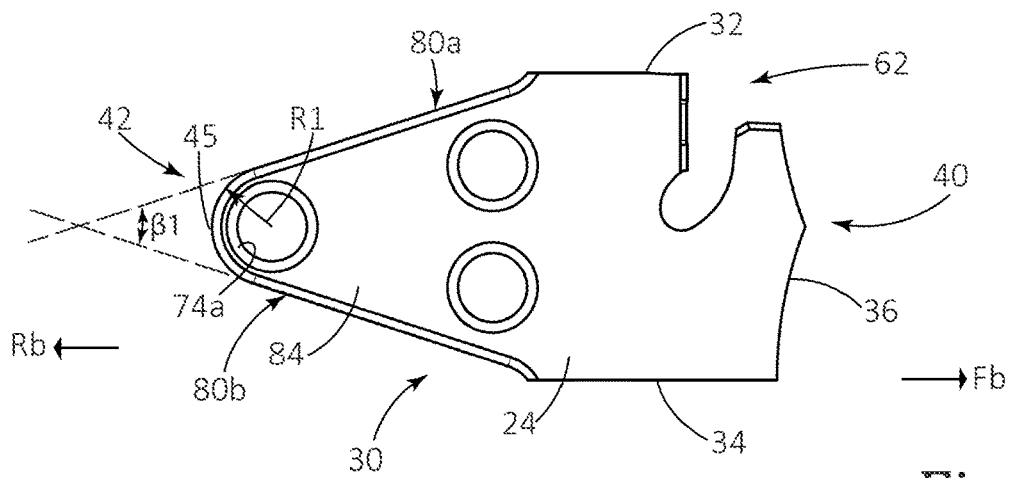
FIG. 8c is a second side view of the cutting blade of FIG. 7.

With further reference to FIGS. 7 to 8c, the cutting blade 20 extends along a central blade axis L defining opposite forward and rearward blade directions Fb, Rb. A longitudinal first symmetry plane S1 contains the central blade axis L. A lateral second symmetry plane S2 extends perpendicular to the first symmetry plane S1, also containing the central blade axis L.

The cutting blade 20 includes opposite first and second blade side surfaces 22, 24, and a blade peripheral surface 30 extending therebetween. The first and second blade side surfaces 22, 24 extend along, and on opposite sides of, the first symmetry plane S1. Restated, the first symmetry plane S1 passes in-between the opposing first and second blade side surfaces 22, 24 (in addition to containing the central blade axis L).

The blade peripheral surface 30 connects the first and second blade side surfaces 22, 24 and includes top and bottom blade surfaces 32, 34, and a forwardly facing forward blade surface 36 located therebetween. Each of the top, bottom and forward blade surfaces 32, 34, 36 extends between the first and second blade side surfaces 22, 24. The top and bottom blade surfaces 32, 34 extend along, and on opposite sides of, the second symmetry plane S2.

The cutting blade 20 further includes a blade cutting portion 50 and a blade fastening portion 70. The blade cutting portion 50 extends in the rearward blade direction Rb from a forward blade end 40. The blade fastening portion 70 extends from the blade cutting portion 50 to a rearward blade end 42. The forward blade end 40 delimits the cutting blade 20 in the forward blade direction Fb. The rearward blade end 42 delimits the cutting blade 20 in the rearward blade direction Rb.

A first insert seat 62 is located in the blade cutting portion 50, at an intersection of the first blade side surface 22, the second blade side surface 24 and the blade peripheral surface 30. The cutting insert 60 is releasably secured in the first insert seat 62. The first insert seat 62 includes an insert support surface 66, supporting the cutting insert 60 and directed against forces (not shown) acting on the cutting insert 60 during machining operations.

The first insert seat 62 may further include an insert back support surface 68, supporting the cutting insert 60, inclined relative to the insert support surface 66 and preferably, but optionally, perpendicular thereto. By definition, the fastening portion 70 is devoid of insert seats. The insert support surface 66 and the insert back support surface 68 are preferably, but optionally on the same side of the second symmetry plane S2.

In accordance with some embodiments, the first insert seat 62 is located at an intersection of the first blade side surface 22, the second blade side surface 24, the forward blade surface 36 and one of the top and bottom blade surfaces 32, 34.

In accordance with some embodiments, the insert support surface 66 extends in the same basic direction as the second symmetry plane S2. As shown in FIGS. 1 to 3d and 7 to 8c, the cutting insert 60 is secured in the first insert seat 62, which is located at an intersection of the first blade side surface 22, the second blade side surface 24, the forward blade surface 36 and the top blade surface 32. The cutting forces are generally directed in a direction from the top blade surface 32 towards the bottom blade surface 34. In the field of grooving and parting off metal machining, cutting tools as described above are generally referred to as X-axis cutting tools.

Figure 10A:
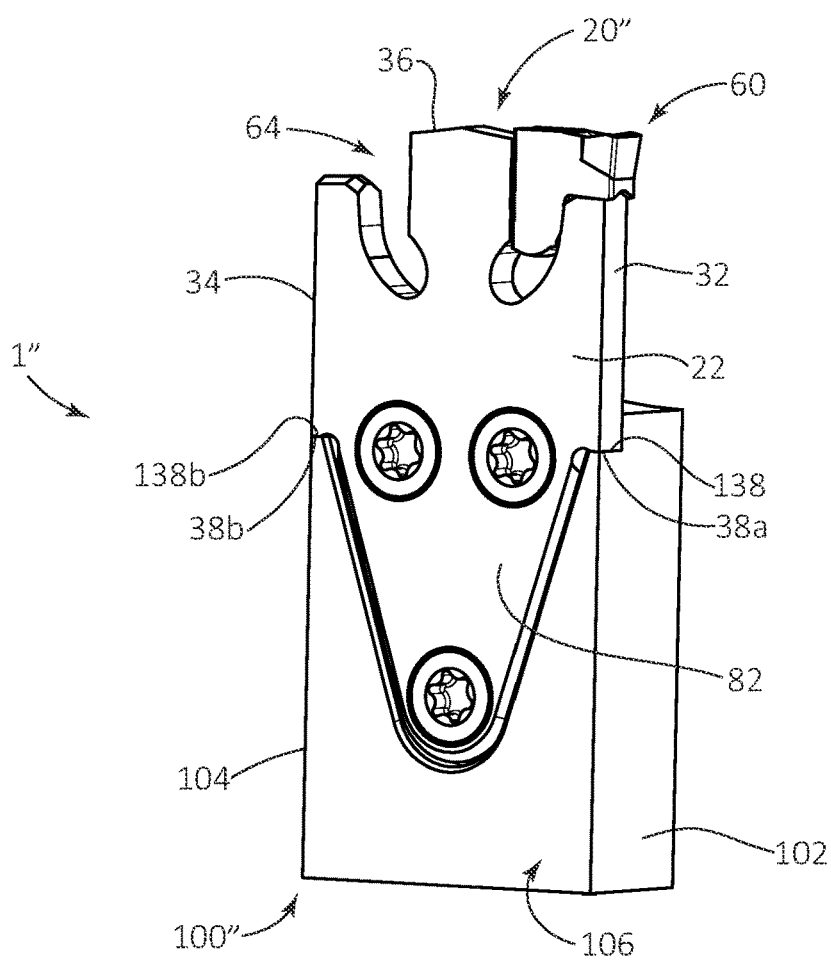
FIG. 10a is a perspective view of a cutting tool in accordance with a further embodiment of the present invention.
Figure 10B:
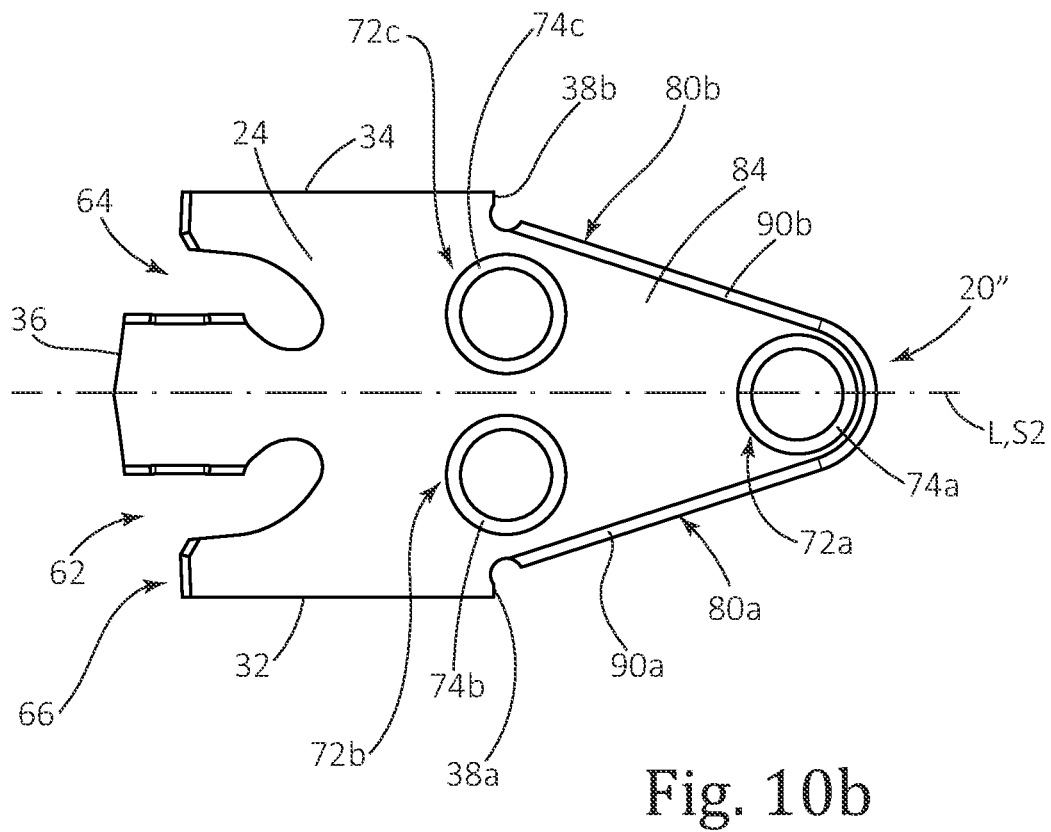

In accordance with some embodiments, the insert support surface 66 extends transversely to the second symmetry plane S2 (such that an imaginary extension thereof would intersect said second symmetry plane S2). With reference to FIGS. 10a and 10b, the cutting insert 60 is secured in the first insert seat 62, which is located at an intersection of the first blade side surface 22, the second blade side surface 24, the forward blade surface 36 and the top blade surface 32. The cutting forces are generally directed in a direction from the forward blade surface 36 towards the rearward blade end 42. In the field of grooving and parting off metal machining, cutting tools as described above are generally referred to as Y-axis cutting tools.

In accordance with some embodiments, for example as shown in FIGS. 10a and 10b, the blade cutting portion 50 further includes a second insert seat 64, which is located at an intersection of the first blade side surface 22, the second blade side surface 24 and the blade peripheral surface 30, as will be discussed in further detail below.

With further reference to FIGS. 7 to 8c, the blade fastening portion 70 includes a first peripheral blade abutment sub-surface 80a, a second peripheral blade abutment sub-surface 80b and opposite first and second blade side abutment sub-surfaces 82, 84 located on the first and second blade side surfaces 22, 24, respectively. At least one of the first and second blade side abutment sub-surfaces 82, 84 abuts against the tool holder 100 when the cutting blade 20 is secured to the tool holder 100.

In accordance with some embodiments, for example as shown in FIGS. 7 to 8c, the first and second blade side abutment sub-surfaces 82, 84 are preferably, but optionally, flush (i.e., form a continuous surface) with the first and second blade side surfaces 22, 24, respectively. Alternatively, the first and second blade side abutment sub-surfaces 82, 84 may each be located further away from the first symmetry plane S1 than the first and second blade side surfaces 22, 24 with a step being formed between surfaces on the same side of the cutting blade 20. In such case, the step may have a step shape or may simply be a slanted surface, etc.

The blade fastening portion 70 further includes a first blade bore 72a (which could also be called a "rearward first blade bore" in embodiments with one or more additional blade bores located forward thereof), opening out to the first and second blade side abutment sub-surfaces 82, 84. The first blade bore 72a may exhibit mirror symmetry about the second symmetry plane S2. The first blade bore 72a may further exhibit mirror symmetry about the first symmetry plane S1.

The blade cutting portion 50 is preferably, but optionally, devoid of blade bores, as shown in all of the embodiments. It will be understood that bores can weaken a structure hence this preference. Nonetheless, there may be holes, likely very small holes, in a blade cutting portion for a different reason such as to release a cutting insert from an insert pocket, as is typical for some insert pocket types.

The first and second peripheral blade abutment sub-surfaces 80a, 80b are located on the blade peripheral surface 30 and converge in the rearward blade direction Rb on opposite sides of the second symmetry plane S2 in a V-shaped manner. The first and second peripheral blade abutment sub-surfaces 80a, 80b exhibit a mirror symmetric angle about the second symmetry plane S2. The first and second peripheral blade abutment sub-surfaces 80a, 80b may further exhibit mirror symmetry about the second symmetry plane S2. The first and second peripheral blade abutment sub-surfaces 80a, 80b may also be oblique to the top and bottom blade surfaces 32, 34, respectively.

Surfaces having a mirror symmetric angle, referring to their location and slope, do not necessarily exhibit total mirror symmetry, due to possible differences in extent (length) etc., relative to a chosen symmetry plane. However, surfaces said to be exhibiting a "mirror symmetry" and not just a mirror symmetric angle, implies that they also exhibit total mirror symmetry.

Furthermore, at the rearward blade end 42, the first and second blade abutment sub-surfaces 80a, 80b preferably, but optionally, merge tangentially with a non-abutting arcuate terminal end surface 45 having a first radius of curvature R1. Having such a radius serves the purpose of shortening a blade length L1 of the cutting blade 20 (compared to a sharp corner), while also allowing the first blade bore 72a to be positioned as rearwardly as possible. While preferable, it will be noted that the center of such a radiused surface may not necessarily coincide with the center of the first blade bore 72a.

As seen in FIG. 8c, in a side view of the cutting blade 20, the opposing blade abutment sub-surfaces 80a, 80b of the blade fastening portion 70 taper in the rearward blade direction Rb towards the rearward blade end 42 to form a first taper angle β1. In some embodiments, the first taper angle β1 satisfies the following condition: $10°≤β1≤80°$. Preferably, the first taper angle β1 satisfies the following condition: $20°≤β1≤60°$. Most preferably, the first taper angle β1 satisfies the following condition: $25°≤β1≤40°$.

In accordance with some embodiments, the first blade bore 72a preferably, but optionally, includes a first bore double-ended cone 74a, tapering away from the first and second blade side surfaces 22, 24 toward the first symmetry plane S1. The first bore double-ended cone 74a may exhibit mirror symmetry about the first symmetry plane S1. The first bore double-ended cone 74a may further exhibit mirror symmetry about the second symmetry plane S2.

In accordance with some embodiments, the blade fastening portion 70 preferably, but optionally, further include a second blade bore 72b, opening out to the first and second blade side abutment sub-surfaces 82, 84.

The blade fastening portion 70 preferably, but optionally, also include a third blade bore 72c, opening out to the first and second blade side abutment sub-surfaces 82, 84. The second and third blade bores 72b, 72c may exhibit mirror symmetry about the second symmetry plane S2 on opposite sides thereof. The second and third blade bores 72b, 72c are preferably located forwardly of the first blade bore 72a.

In accordance with some embodiments, each of the second and third blade bores 72b, 72c preferably, but optionally, includes a respective second and third bore double-ended cone 74b, 74c. Each of the second and third bore double-ended cones 74b, 74c tapers away from the first and second blade side surfaces 22, 24 toward the first symmetry plane S1.

Each of the second and third bore double-ended cones 74b, 74c may exhibit mirror symmetry about the first symmetry plane S1. The second and third bore double-ended cones 74b, 74c may exhibit mirror symmetry about the second symmetry plane S2.

The first and second peripheral blade abutment sub-surfaces 80a, 80b exhibit a mirror symmetric angle about the first symmetry plane S1. The first and second peripheral blade abutment sub-surfaces 80a, 80b may further exhibit mirror symmetry about the first symmetry plane S1.

In accordance with some embodiments, the cutting blade 20 preferably, but optionally, exhibits mirror symmetry about the first symmetry plane S1. At the fastening portion 70, the cutting blade 20 may further exhibit mirror symmetry about the second symmetry plane S2.

Figure 4:
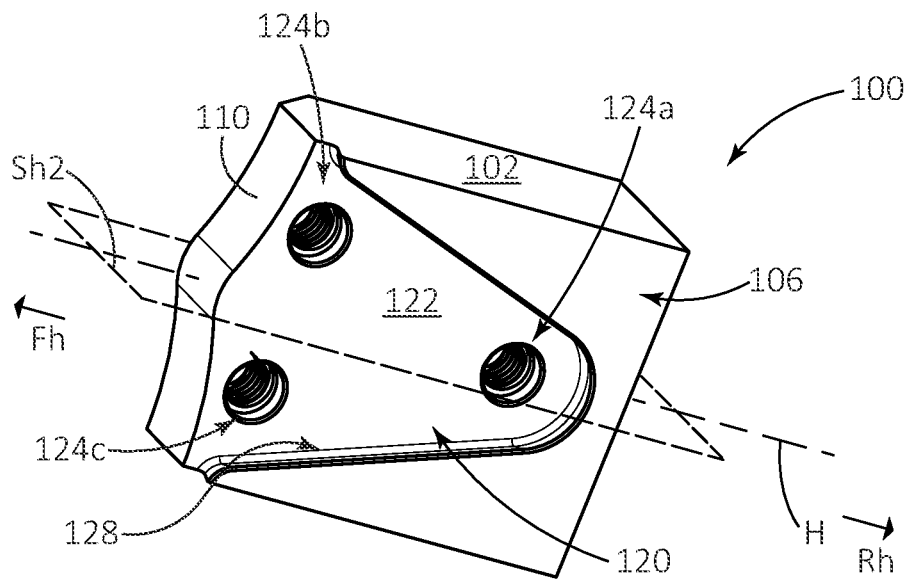
FIG. 4 is a perspective view of the tool holder of FIG. 1.
Figure 5:
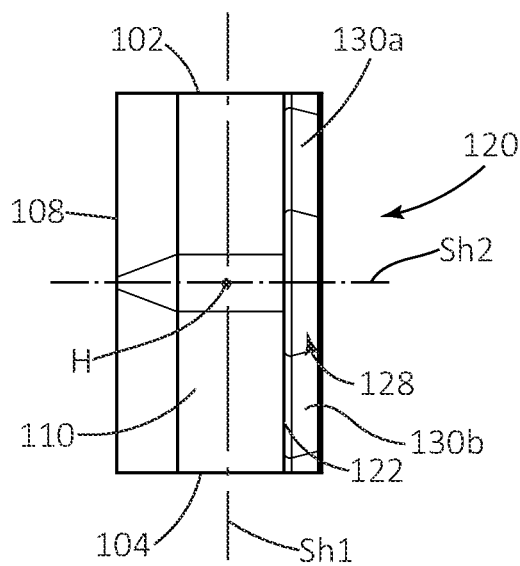
FIG. 5 is a forward view of the tool holder of FIG. 1.
Figure 6:
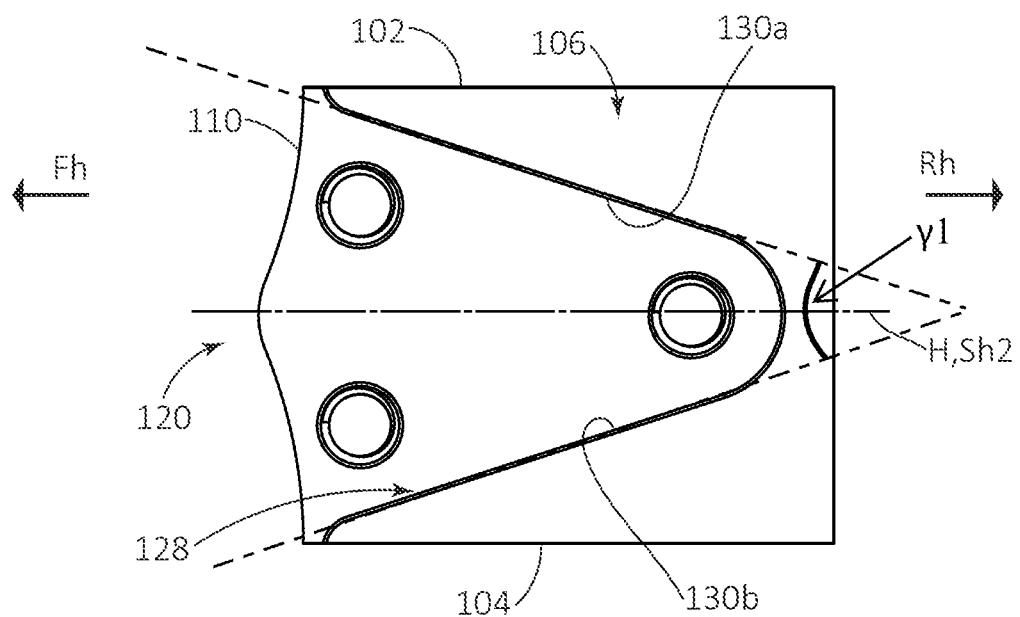
FIG. 6 is a front view of the tool holder of FIG. 1.

Attention is now drawn to FIGS. 4 to 6, where the tool holder 100 is shown. The tool holder 100 extends along a holder longitudinal axis H defining opposite forward and rearward holder directions Fh, Rh.

As seen in FIG. 5, the tool holder 100 has a longitudinal first holder plane Sh1 which contains the holder longitudinal axis H. The tool holder 100 is not mirror symmetric about the first holder plane Sh1. The tool holder 100 also has a holder symmetry plane Sh2 which is perpendicular to the first holder plane Sh1, also containing the holder longitudinal axis H.

The tool holder 100 includes opposing upper and lower holder surfaces 102, 104 extending along, and on opposite sides of, the holder symmetry plane Sh2. The tool holder 100 further includes opposing first and second side holder surfaces 106, 108 extending along the holder longitudinal axis H and connecting the upper and lower holder surfaces 102, 104. A front holder surface 110 connects and delimits the upper and lower holder surfaces 102, 104 as well as the first and second side holder surfaces 106, 108.

In accordance with some embodiments, the upper and lower holder surfaces 102, 104 preferably, but optionally, exhibit a mirror symmetric angle about the holder symmetry plane Sh2, relative to one another. Specifically, as shown in FIG. 6, the mirror symmetric angle between the upper and lower holder surfaces 102, 104 about the holder symmetry plane Sh2 may be zero.

Differently said, the upper and lower holder surfaces 102, 104 may extend parallel to one another, as well as to the holder symmetry plane Sh2.

A "mirror symmetric angle" is mentioned, for example, because the upper and lower holder surfaces 102, 104 could be relatively longer and shorter than each other, or have differing distances from the holder symmetry plane Sh2, yet still provide the required function. It will of course be understood that the upper and lower holder surfaces 102, 104 may preferably have mirror symmetry about the holder symmetry plane Sh2.

In accordance with some embodiments, the tool holder 100 preferably exhibits mirror symmetry about the holder symmetry plane Sh2.

A blade pocket 120 is recessed in the first side holder surface 106 and opens out to the front holder surface 110. The blade pocket 120 includes a pocket base abutment surface 122, a first holder bore 124a and a pocket peripheral surface 128 transverse to the holder symmetry plane Sh2. The pocket peripheral surface 128 further converges toward the holder symmetry plane Sh2 in the rearward holder direction Rh. As seen in FIG. 5, the pocket base abutment surface 122 is parallel to the first holder plane Sh1 or, stated differently, perpendicular to the holder symmetry plane Sh2.

In accordance with some embodiments, the tool holder 100 includes only one blade pocket 120. In these embodiments, to allow the cutting tool 1 to operate in both left-hand and right-hand machining operations, the tool holder 100 is rotated 180° about the holder longitudinal axis H. The blade pocket 120 can then be located for right-hand machining as well as left-hand machining. This may allow for a more compact tool holder 100 than a tool holder having a plurality of blade pockets.

The first holder bore 124a opens out to the pocket base abutment surface 122 and extends toward the second side holder surface 108. As best seen in FIG. 6, the first holder bore 124a is preferably proximate to the V-shaped pocket peripheral surface 128 in the rearward holder direction Rh. Further, in embodiments with multiple holder bores it is the closest bore to the pocket peripheral surface 128 in the rearward holder direction Rh.

In accordance with some embodiments, the blade pocket 120 includes a second holder bore 124b. Preferably, the blade pocket 120 further includes a third holder bore 124c. The second and third holder bores 124b, 124c open out to the pocket base abutment surface 122 and extend towards the second side holder surface 108. The second and third holder bores 124b, 124c are located forwardly of the first holder bore 124a. Each of the first, second and third holder bores 124a, 124b, 124c may be oblique to the pocket base abutment surface 122.

In accordance with some embodiments, the first, second and third holder bores 124a, 124b, 124c preferably, but optionally exhibit mirror symmetry about the holder symmetry plane Sh2. That is to say, the first holder bore 124a may open out to the pocket base abutment surface 122 in a manner centered about the holder symmetry plane Sh2, and the second and third holder bores 124b, 124c may open out to the pocket base abutment surface 122 and be equally distanced from the holder symmetry plane Sh2 on opposite sides thereof.

The pocket peripheral surface 128 is transverse to the pocket base abutment surface 122 and extends therefrom towards the first side holder surface 106. The pocket peripheral surface 128 includes first and second pocket abutment walls 130a, 130b converging in the rearward holder direction Rh at a first holder taper angle γ1, from opposing sides of the holder symmetry plane Sh2. The first and second pocket abutment walls 130a, 130b exhibit a mirror symmetric angle about the holder symmetry plane Sh2. The first and second pocket abutment walls 130a, 130b may further exhibit mirror symmetry about the holder symmetry plane Sh2.

Figure 2:
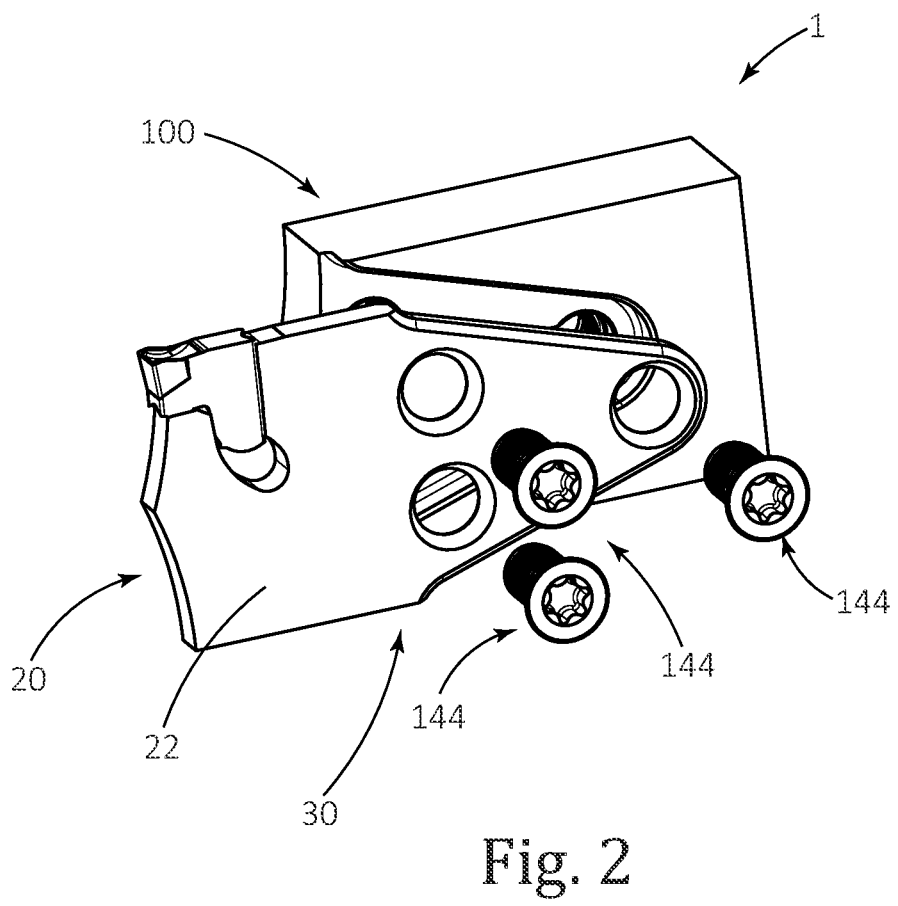
FIG. 2 is an exploded perspective view of the cutting tool of FIG. 1.

As best seen in FIGS. 1 and 2, when the cutting tool 1 is in an assembled state, the cutting blade 20 is releasably retained in the tool holder 100, and the cutting insert 60 is releasably retained in the cutting blade 20. Specifically, the cutting blade 20 is releasably retained in the blade pocket 120 by a fastening member 144. The fastening member 144 passes through the first blade bore 72a and engages with the first holder bore 124a.

The second blade side abutment sub-surface 84 abuts the pocket base abutment surface 122. The first and second peripheral blade abutment sub-surfaces 80a, 80b abut the first and second pocket abutment walls 130a, 130b, respectively. As such, in a given tool, the aforementioned first holder taper angle γ1 formed by the rearwardly converging first and second pocket abutment walls 130a, 130b, matches the first taper angle β1 formed by the rearwardly converging peripheral blade abutment sub-surfaces 80a, 80b.

In accordance with some embodiments, a plurality of fastening members pass through the plurality of blade bores and engage the plurality of holder bores. Specifically, three fastening members 144 may each be located through one of the first, second and third blade bores 72a, 72b, 72c and respectively engaging the first, second and third holder bores 124a, 124b, 124c.

Alternatively, while the arrangements shown are believed to be optimal, it is possible for a cutting blade to have only first and second blade bores 72a, 72b, with a tool holder having first, second and third holder bores 124a, 124b, 124c. In such option, the second holder bore 124b exhibits mirror symmetry with the third holder bore 124c about the holder symmetry plane Sh2.

In such a case, when such a cutting blade is fastened to such a tool holder, one fastening member 144 may be located through the first blade bore 72a, engaging the first holder bore 124a, and another fastening member 144 may be located through the second blade bore 72b, engaging one of the second and third holder bores 124b, 124c.

It will be noted that the opposite is also possible. To clarify, it is also possible for a tool holder to have only first and second holder bores 124a, 124b, with a cutting blade having first, second and third blade bores 72a, 72b, 72c. In such option, the second blade bore 72b exhibits mirror symmetry with the third blade bore 72c about the second symmetry plane S2.

In such a case, when such a cutting blade is fastened to such a tool holder, one fastening member 144 may be located through the first blade bore 72a, engaging the first holder bore 124a, and another fastening member 144 may be located through one of the second and third blade bores 72b, 72c, engaging the second holder bore 124b.

In both cases outlined above, the cutting tool can still be mounted to a turret in four different configurations, as will be discussed below.

In accordance with some embodiments, the fastening member 144 abuts the first bore double-ended cone 74a. Preferably, a plurality of fastening members abut a plurality of bore double-ended cones. Specifically, fastening members 144 may respectively abut the first, second and third bore double-ended cones 74a, 74b, 74c.

The fastening members 144 actuates the abutment of one of the first and second blade side abutment sub-surfaces 82, 84 against the pocket base abutment surface 122. Simultaneously, the fastening members 144 abut against the first, second and third bore double-ended cones 74a, 74b, 74c. Preferably, but optionally, at least one the portions of the first, second and third bore double-ended cones 74a, 74b, 74c, located in the forward blade direction Fb abut against the fastening members 144 in a biased arrangement which drives the cutting blade 20 rearwardly in the blade pocket 120.

Due to the shape of the first and second peripheral blade abutment sub-surfaces 80a, 80b and the first and second pocket abutment walls 130a, 130b, the rearward movement of the cutting blade 20 brings the pairs of surfaces into abutment.

The first, second and third bore double-ended cones 74a, 74b, 74c also allow abutment between the fastening members 144 and the cutting blade 20 to be confined to each of the first, second and third blade bores 72a, 72b, 72c, respectively, allowing the fastening members 144 to be flush with the first or second blade side abutment sub-surfaces 82, 84, as discussed below. Alternatively, the fastening members 144 may abut against one of the first and second blade side abutment sub-surfaces 82, 84.

As best seen in FIG. 8a, a cutting portion longitudinal extent Dc and a fastening portion longitudinal extent Df are defined as follows. The cutting portion longitudinal extent Dc is defined along the central blade axis L and delimited by the blade cutting portion 50. The fastening portion longitudinal extent Df is defined along the central blade axis L and delimited by the blade fastening portion 70.

In accordance with some embodiments, the cutting portion longitudinal extent Dc and the fastening portion longitudinal extent Df preferably, but optionally, fulfil the condition: $Dc \leq Df$.

The blade cutting portion 50 and the blade fastening portion 70 are functional portions readily apparent to a skilled person. They are also easily identifiable when the cutting blade 20 is secured to the tool holder 100.

In the cutting blade embodiments 20, 20' shown in the figures, an exemplified boundary B between the blade cutting portion 50 and the blade fastening portion 70 may be considered to be located at the forwardmost portion of the forwardmost blade bore. In the cutting blade embodiments 20, 20' the forwardmost blade bores are the second and third blade bores 72b, 72c. More specifically, the boundary B between the blade cutting portion 50 and the blade fastening portion 70 may be considered to be located at the forwardmost portion of the second and/or third bore double-ended cones 74b, 74c.

Figure 9A:
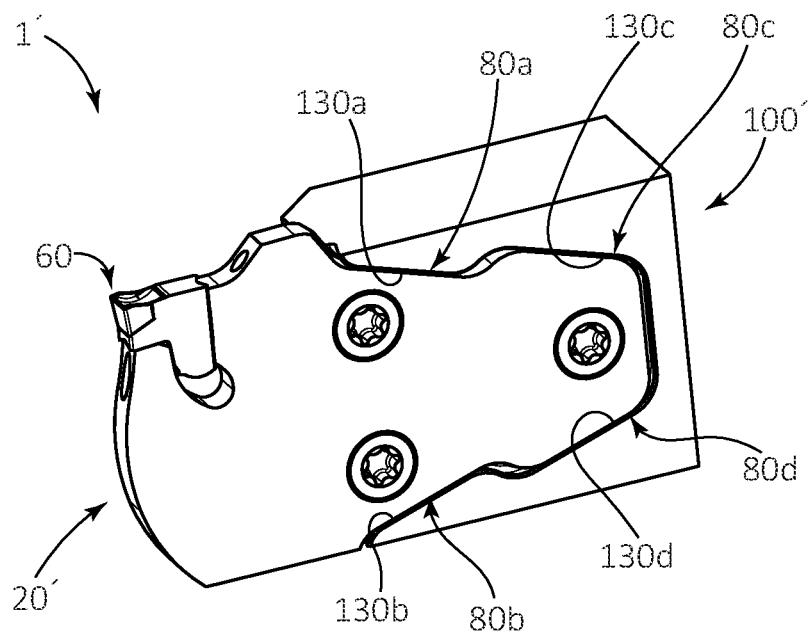
FIG. 9a is perspective view of a cutting tool in accordance with another embodiment of the present invention.
Figure 9B:
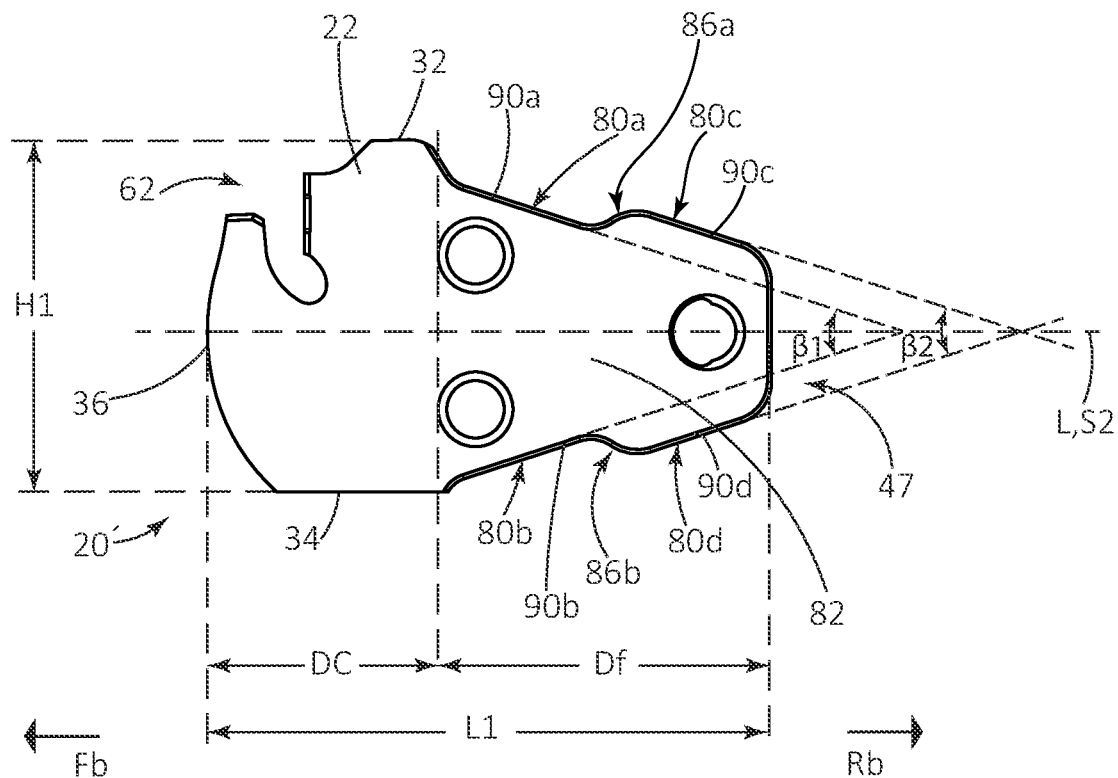

As seen in the blade embodiments of FIGS. 8a and 9b, the cutting blade 20, 20' has an overall blade length L1 measured parallel to the central blade axis L, L1=Dc+Df, and a blade height H1 measured between the top and bottom blade surfaces 32, 34, in a direction perpendicular to the central blade axis L. In some embodiments, the blade height H1 and the blade length L1 satisfy the condition: H1<L1. Preferably, L1<3H1. More preferably L1<2H1. As seen in the rear end view of FIG. 8b, a blade thickness T1 of the cutting blade is measured between the first and second blade side surfaces 22, 24 in a direction perpendicular to the first symmetry plane P1, the aforementioned blade height H1 being greater than the blade thickness T1, i.e., H1>T1.

The blade cutting portion 50 could be alternatively defined relative to the tool holder 100. In such case the blade cutting portion 50 is the part of the cutting blade 20 which extends forward of the tool holder 100 when mounted thereto.

In accordance with some embodiments, the first and second blade side abutment sub-surfaces 82, 84 are optionally demarcated from the first and second blade side surfaces 22, 24. For example the distance between the first and second blade side surfaces 22, 24 may each be located closer to the first symmetry plane S1 than the first and second blade side abutment sub-surfaces 82, 84, respectively. Restated, the thickness (width) of the cutting blade 20 may be narrower at the first and second blade side surfaces 22, 24 than at the first and second blade side abutment sub-surfaces 82, 84.

This is consistent with the cutting blade 20 being used for grooving and parting operations, in which it is preferable to have the blade thinner where the cutting insert 60 is retained so that the blade may enter the narrow groove being cut into the workpiece.

While the embodiments shown are preferred (having an equally thick blade cutting portion 50 and blade fastening portion 70), it should be understood that it is possible for the blade fastening portion 70 to be designed thicker than the blade cutting portion 50 for structural strength purposes.

In such a case, the boundary B between the blade fastening portion 70 and the blade cutting portion 50 is considered to be located at the forwardmost portion of the first and second blade side abutment sub-surfaces 82, 84. As such, the first and second blade side abutment sub-surfaces 82, 84 extend along the central blade axis L at the blade fastening portion 70.

The cutting portion longitudinal extent Dc is then defined parallel to the central blade axis L from the forward blade end 40 to, and not including, the first and second blade side abutment sub-surfaces 82, 84, or restated, the boundary B. The fastening portion longitudinal extent Df is then defined parallel to the central blade axis L from the rearward blade end 42 to, and including, the first and second blade side abutment sub-surfaces 82, 84, or restated, the boundary B.

With particular reference to FIGS. 3*a* to 3*d*, the assembled cutting tool 1 has four possible configurations. In a first configuration, shown in FIG. 3*a*, the cutting blade 20 is, as described above, secured in the blade pocket 120 with the second blade side abutment sub-surfaces 84 abutting the pocket base abutment surface 122.

Figure 3A:
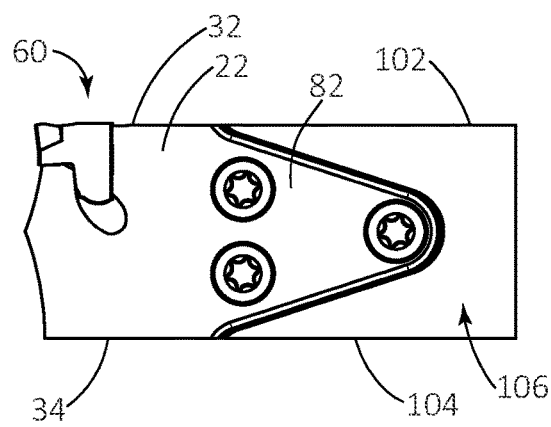
FIG. 3a is a side view of a first configuration of the cutting tool of FIG. 1.
Figure 3C:
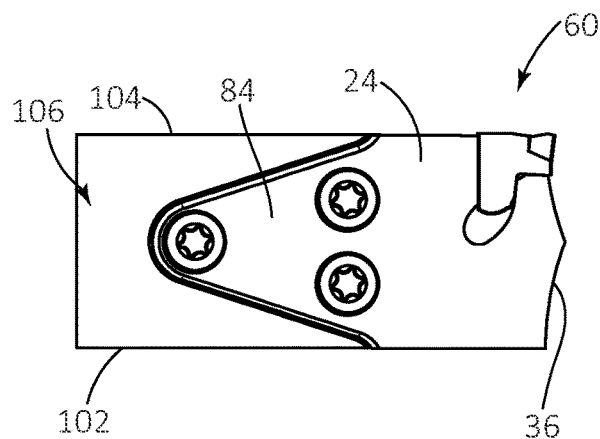
FIG. 3c is a side view of a third configuration of the cutting tool of FIG. 1.
Figure 3B:
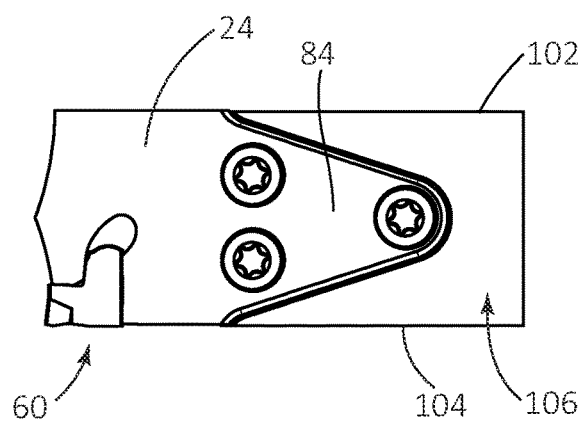
FIG. 3b is a side view of a second configuration of the cutting tool of FIG. 1.

In a second configuration, shown in FIG. 3*b*, the first blade side abutment sub-surface 82 abuts the pocket base abutment surface 122.

In the second configuration of FIG. 3*b*, both the cutting blade 20 and the cutting insert 60 are rotated 180° about the central blade axis L, relative to the first configuration of FIG. 3*a*. In both configurations the cutting insert 60 secured in the first insert seat 62 can be used for machining operations. To facilitate usage of the cutting insert 60 in both configurations, the blade cutting portion 50 extends forwardly of the tool holder 100 without support abutting against either of the top and bottom blade surfaces 32, 34.

In turning machining, a workpiece (not shown) is rotated about an axis with a cutting insert bracing against the rotation of the workpiece. The workpiece can be rotated in two opposite directions about said axis. The first and second configurations allow for machining a workpiece in both directions of rotation.

In the third configuration, shown in FIG. 3*c*, the tool holder 100 is rotated 180° relative to the configuration shown in FIG. 3*a* with the first blade side abutment sub-surface 82 abutting the pocket base abutment surface 122.

Figure 3D:
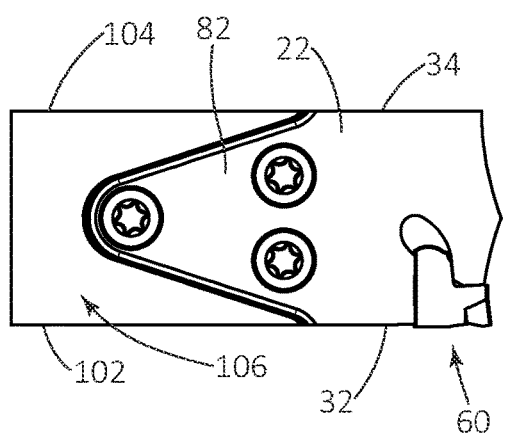
FIG. 3d is a side view of a fourth configuration of the cutting tool of FIG. 1.

In the fourth configuration, shown in FIG. 3*d*, the tool holder 100 is rotated 180° relative to the configuration shown in FIG. 3*b* with the second blade side abutment sub-surface 84 abutting the pocket base abutment surface 122.

To elaborate, it will be understood that the symmetry of the cutting blade 20 allows it to be mounted in two orientations in the same tool holder 100. Further, the symmetry of the tool holder 100 allows it to be mounted in two orientations in a turret. Thus, the same cutting blade 20 and tool holder 100 allow for the above-said four different machining configurations.

The four configurations of the cutting tool 1 mean that an operator can use the same cutting blade 20, cutting insert 60 and tool holder 100 in varying machining operations. This saves the need to obtain specific cutting tools for each cutting operation, as well as sparing the need to change the cutting tool used. Instead, the symmetry of the cutting tool 1 of the present invention can be used repeatably for different turning operations, such both right-hand and left-hand machining operations.

In accordance with some embodiments, when the cutting tool 1 is in the assembled state the fastening member 144 and the first and second blade side surfaces 22, 24 are preferably, but optionally, flush, or recessed relative to, the first side holder surface 106, in a direction perpendicular to the first symmetry plane S1. Differently said, the first side holder surface 106 may delimit the cutting tool 1 in a direction perpendicular to the first symmetry plane S1.

It is possible for one of the first and second blade side surfaces 22, 24, or the fastening member 144, or both, may protrude beyond the first side holder surface 106, in a direction perpendicular to the first symmetry plane S1. However, it is still preferred that such protrusion be minimal. For example, the fastening member 144 may protrude beyond the first side holder surface 106, in a direction perpendicular to the first symmetry plane S1, by 2 mm or less, and preferably 1 mm or less.

One manner which allows the fastening member 144 to be flush, or recessed relative to, the cutting blade 20 is the use of conical surfaces, such as the first, second and third bore double-ended cones 74*a*, 74*b*, 74*c*. The abutment of the fastening members 144 may then be confined to within the first, second and third blade bores 72*a*, 72*b*, 72*c*.

Having all the fastening members 144 and the cutting blade 20 be flush, or recessed relative to, the first side holder surface 106, in a direction perpendicular to the first symmetry plane S1, is desirable in certain machining operations. This may allow the cutting tool 1 to machine a workpiece to the same depth at most points along its axis, regardless of radially extending obstructions.

In accordance with some embodiments, for example as shown in FIG. 8*b*, the first and second peripheral blade abutment sub-surfaces 80*a*, 80*b* of the cutting blade 20 preferably, but optionally, include, respectively, first and second blade prisms 90*a*, 90*b* exhibiting a mirror symmetric angle about the second symmetry plane S2. The first and second blade prisms 90*a*, 90*b* may further exhibit mirror symmetry about the second symmetry plane S2.

Each of the first and second blade prisms 90*a*, 90*b* is V-shaped, convexly converging from the first and second blade side surfaces 22, 24. Each of the first and second blade prisms 90*a*, 90*b* is adapted to further secure the cutting blade 20 in the blade pocket 120, as will be specified below.

Specifically, the first peripheral blade abutment sub-surface 80*a* may include a first V-shaped blade prism 90*a* converging in a first direction away from the second symmetry plane S2 and towards the first symmetry plane S1. The second peripheral blade abutment sub-surface 80*b* may include a second V-shaped blade prism 90*b* converging in a second direction away from the second symmetry plane S2 and towards the first symmetry plane S1. Each of the first and second blade prisms 90*a*, 90*b* may exhibit a mirror symmetric angle about the first symmetry plane S1. Each of the first and second blade prisms 90*a*, 90*b* may further exhibit mirror symmetry about the first symmetry plane S1.

In accordance with some embodiments, as best seen in FIGS. 5 and 6, the first and second pocket abutment walls 130*a*, 130*b* converge in the rearward holder direction Rh. Further, the first and second pocket abutment walls 130*a*, 130*b* may preferably, but optionally, extend in an outward direction from the pocket base abutment surface 122 and converge towards the holder symmetry plane Sh2 to create a dovetail arrangement.

The incline of the first and second pocket abutment walls 130*a*, 130*b* may accommodate abutment with the first and second blade prisms 90*a*, 90*b*. Abutment between the first and second blade prisms 90*a*, 90*b* and the first and second pocket abutment walls 130*a*, 130*b* directs forces arising from the engagement (not shown) in a direction perpendicular to the first and second pocket abutment walls 130*a*, 130*b*.

Figure 9C:
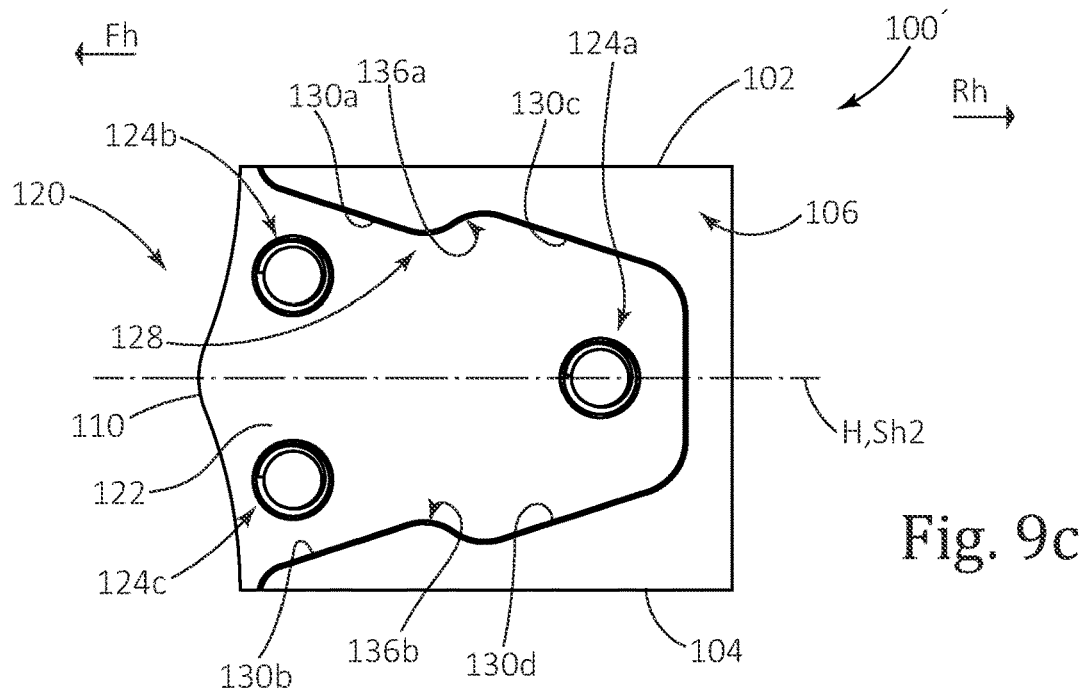

With further reference to FIGS. 9*a* to 9*c*, a cutting tool 1' in accordance with another embodiment of the present invention is shown. The cutting tool 1' includes a cutting blade 20' and a tool holder 100'. Elements of similar function will be denoted herein with the same numeral indication as in FIGS. 1 to 8c.

The blade fastening portion 70 of the cutting blade 20' further includes a first blade transition surface 86a, a second blade transition surface 86b, a third peripheral blade abutment sub-surface 80c and a fourth peripheral blade abutment sub-surface 80d. The third and fourth peripheral blade abutment sub-surfaces 80c, 80d are located rearwardly of the first and second peripheral blade abutment sub-surfaces 80a, 80b.

The third and fourth peripheral blade abutment sub-surfaces 80c, 80d converge in the rearward blade direction Rb on opposite sides of the second symmetry plane S2. In some embodiments, as seen in the FIG. 9b side view, at the rearward blade end 42, the third and fourth blade abutment sub-surfaces 80c, 80d merge with a rearward facing flat surface 47 which is perpendicular to the central blade axis L. This is an alternative option to shorten the blade length L1 of the cutting blade 20'.

As best seen in the FIG. 9b side view of the cutting blade 20', while the first and second peripheral blade abutment sub-surfaces 80a, 80b converge in the rearward blade direction Rb at a first taper angle β1, the third and fourth peripheral blade abutment sub-surfaces 80c, 80d converge in the same rearward blade direction Rb at a second taper angle β2. While it is preferable that in some embodiments the first and second taper angles β1, β2 are identical, it is feasible that the first and second taper angles β1, β2 can differ from one another.

The first blade transition surface 86a is located between the first peripheral blade abutment sub-surface 80a and the third peripheral blade abutment sub-surface 80c. Notably, both the first peripheral blade abutment sub-surface 80a and the third peripheral blade abutment sub-surface 80c are on the same side of the second symmetry plane S2.

The second blade transition surface 86b is located between the second peripheral blade abutment sub-surface 80b and the fourth peripheral blade abutment surface 80d. Notably, both the second peripheral blade abutment sub-surface 80b and the fourth peripheral blade abutment surface 80d are on the same side of the second symmetry plane S2.

The third and fourth peripheral blade abutment sub-surfaces 80c, 80d may include a third blade prism 90c and a fourth blade prism 90d, respectively.

The pocket peripheral surface 128 of the tool holder 100' further includes first and second holder transition surfaces 136a, 136b, and third and fourth pocket abutment walls 130c, 130d. The third and fourth pocket abutment walls 130c, 130d are located rearwardly of the first and second pocket abutment walls 130a, 130b.

The third and fourth pocket abutment surfaces 130c, 130d converge in the rearward holder direction Rh from opposing sides of the holder symmetry plane Sh2.

In accordance with some embodiments, the third and fourth pocket abutment walls 130c, 130d preferably, but optionally, extend in an outward direction from the pocket base abutment surface 122 and converge towards the holder symmetry plane Sh2 to create a dovetail arrangement.

The first holder transition surface 136a is located between the first pocket abutment wall 130a and the third pocket abutment wall 130c.

The second holder transition surface 136b is located between the second pocket abutment wall 130b and the fourth pocket abutment wall 130d.

When the cutting tool 1' is in an assembled state, as seen in FIG. 9a, the cutting blade 20' is releasably secured to the tool holder 100' as specified above. The first and second peripheral blade abutment sub-surfaces 80a, 80b abut against the first and second pocket abutment walls 130a, 130b. The third and fourth peripheral blade abutment sub-surfaces 80c, 80d abut against the third and fourth pocket abutment walls 130c, 130d. While it is counterintuitive to have such a large number of abutment surfaces, it was discovered that a combination of precision cutting and flexibility of the blade were sufficient to avoid over-constraint concerns.

In such embodiments, as seen in FIGS. 9a to 9c, on attempting to insert the cutting blade 20' into the blade pocket 120 along the blade central axis L from the front holder surface 110, the first and second pocket abutment walls 130a, 130b abut against the third and fourth peripheral blade abutment sub-surfaces 80c, 80d, thus interfering with longitudinal insertion of the cutting blade 20'. To overcome such interference, the cutting blade 20' may instead be inserted in a direction perpendicular to the first symmetry plane S1 from the first side holder surface 106 into the blade pocket 120.

As specified above, engagement between blade prisms 90a, 90b, 90c, 90d and pocket abutment walls 130a, 130b, 130c, 130d converging in an outward direction away from the pocket base abutment surface 122 further braces the cutting blade 20' against the pocket base abutment surface 122. However, the opening of the blade pocket 120 to the first side holder surface 106 is too narrow to accommodate direct insertion, in a direction perpendicular to the first symmetry plane S1, of a cutting blade 20' having first, second, third and fourth blade prisms 90a, 90b, 90c, 90d.

In accordance with some embodiments, the first and second blade transition surfaces 86a, 86b are distanced from the first and second holder transition surfaces 136a, 136b when the cutting tool 1' is in the assembled state. The blade pocket 120 having a clearance allowing limited movement along the central blade axis L may then allow to insert the cutting blade 20' into the blade pocket 120, as will be explained below.

The cutting blade 20' is first moved perpendicular to the first symmetry plane S1, bringing one of the first and second blade side abutment sub-surfaces 82, 84 into contact with the pocket base abutment surface 122. The first and second blade transition surfaces 86a, 86b are, at this point, located near, and possibly abut, the first and second holder transition surfaces 136a, 136b.

Due to the clearance, the opening of the blade pocket 120 to the first side holder surface 106 can accommodate insertion of the cutting blade 20' in a direction perpendicular to the first symmetry plane S1. At this stage, the first, second, third and fourth blade prisms 90a, 90b, 90c, 90d are spaced away from the first, second third and fourth pocket abutment walls 130a, 130b, 130c, 130d.

Then, the cutting blade 20' is moved in the rearward blade direction Rb, distancing the first and second blade transition surfaces 86a, 86b from the first and second holder transition surfaces 136a, 136b and bringing the first, second, third and fourth blade prisms 90a, 90b, 90c, 90d into abutment against the first, second, third and fourth pocket abutment walls 130a, 130b, 130c, 130d.

Figure 10C:
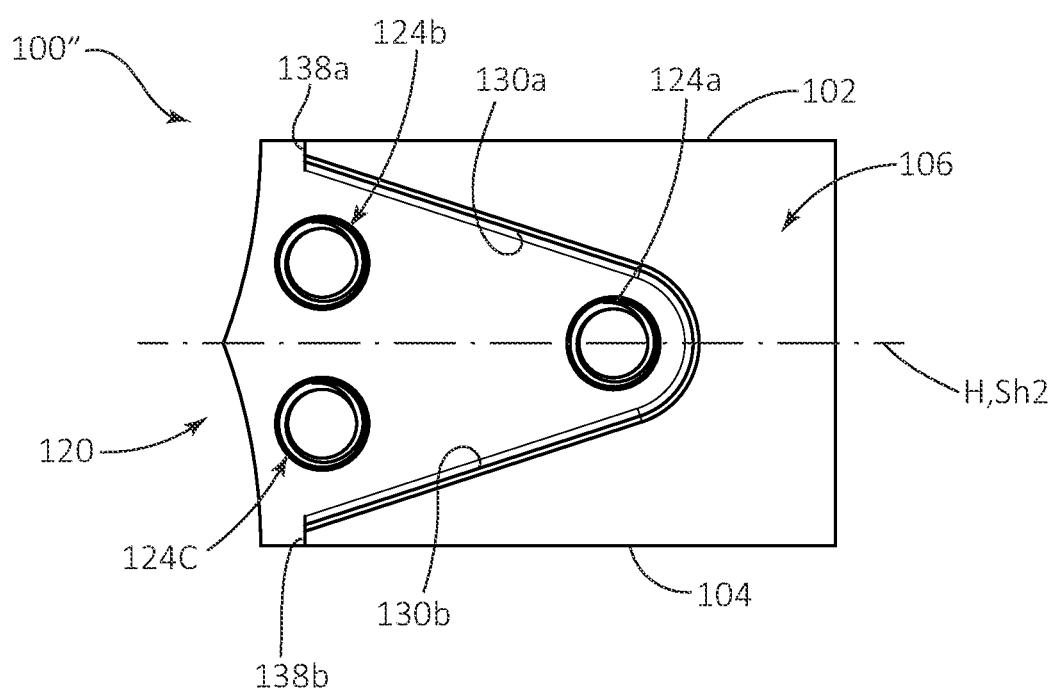

Reference is now made to FIGS. 10a to 10c, which show yet another embodiment of the present invention. A cutting tool 1" in accordance with a further embodiment of the present invention is shown. The cutting tool 1" includes a cutting blade 20" and a tool holder 100". Elements of similar function will be denoted herein with the same numeral indication as FIGS. 1 to 9c.

The cutting blade 20" further includes a second insert seat 64 and a rearward facing pair of blade stopper surfaces 38a, 38b. The second insert seat 64 is located at an intersection of the first blade side surface 22, the second blade side surface 24 and the blade peripheral surface 30. The second insert seat 64 is preferably, but optionally, located at an intersection of the first blade side surface 22, the second blade side surface 24, the bottom blade surface 34 and the forward blade surface 36.

In some prefer embodiments, the first and second insert seats 62, 64 exhibit mirror symmetry about the second symmetry plane S2.

The tool holder 100" further includes a forward facing pair of holder stopper surfaces 138a, 138b. When the cutting tool 1" is in the assembled state, the pair of blade stopper surfaces 38a, 38b abut against the pair of holder stopper surfaces 138a, 138b.

In some embodiments, as shown in FIG. 10b, the rearward facing pair of blade stopper surfaces 38a, 38b extends perpendicular to the second symmetry plane S2. The pair of blade stopper surfaces 38a, 38b may exhibit mirror symmetry about the first and second symmetry planes S1, S2.

The abutment between the pair of blade stopper surfaces 38a, 38b and the pair of holder stopper surfaces 138a, 138b strengthens the coupling between the cutting blade 20" and the tool holder 100", thereby strengthening rigidity of the cutting tool 1" as a whole.

Such stopper surfaces are especially desirable in Y-axis cutting tools. As described above, in Y-axis cutting tools the cutting forces are generally directed along the central blade axis L. The more the cutting forces are directed in the forward to rearward blade and holder directions, the better the support of the blade and holder stopper surfaces 38a, 38b, 138a, 138b against cutting forces.

Although the subject matter of the present application has been described to a certain degree of particularity, it should be understood that various alterations and modifications could be made without departing from the spirit or scope of the invention as hereinafter claimed.

What is claimed is:

1. A cutting blade (20, 20', 20") extending along a central blade axis (L) defining opposite forward and rearward blade directions (Fb, Rb);
the cutting blade (20, 20', 20") having first and second symmetry planes (S1, S2) perpendicular to one another, each containing the central blade axis (L);
the cutting blade (20, 20', 20") comprising:
opposite first and second blade side surfaces (22, 24) extending along, and on opposite sides of, the first symmetry plane (S1), a blade thickness (T1) being measured between the first and second blade side surfaces (22, 24) in a direction perpendicular to the first symmetry plane (S1);
a blade peripheral surface (30) connecting the first and second blade side surfaces (22, 24) and including:
opposite top and bottom blade surfaces (32, 34) extending along, and on opposite sides of, the second symmetry plane (S2), a blade height (H1) being measured between the top and bottom blade surfaces (32, 34) in a direction perpendicular to the central blade axis (L), the blade height (H1) being greater than the blade thickness (T1);
a forwardly facing forward blade surface (36) extending between the top and bottom blade surfaces (32, 34); and
a rearward blade end (42) opposite the forward blade surface (36);

a blade cutting portion (50) comprising a first insert seat (62) located at an intersection of the first blade side surface (22), the second blade side surface (24), the forward blade surface (36) and one of the top and bottom blade surfaces (32, 34); and
a blade fastening portion (70) extending from the blade cutting portion (50) in the rearward blade direction (Rb), wherein at the blade fastening portion (70);
the top blade surface (32) comprises a first peripheral blade abutment sub-surface (80a);
the bottom blade surface (34) comprises a second peripheral blade abutment sub-surface (80b);
the first and second blade side surfaces (22, 24) comprise, respectively, first and second blade side abutment sub-surfaces (82, 84); and
a first blade bore (72a) opens out to the first and second blade side abutment sub-surfaces (82, 84);
wherein:
the first insert seat (62) comprises an insert support surface (66) extending transversely to the second symmetry plane (S2) and directed against forces acting on a cutting insert seated therein during machining operations; and
the first and second peripheral blade abutment sub-surfaces (80a, 80b) converge in the rearward blade direction (Rb) at a first taper angle β1 and exhibit a mirror symmetric angle about the first and second symmetry planes (S1, S2).

2. The cutting blade (20, 20', 20") according to claim 1, wherein:
a cutting portion longitudinal extent Dc, measured along the central blade axis (L) at the blade cutting portion (50), and a fastening portion longitudinal extent Df, measured along the central blade axis (L) at the blade fastening portion (70), fulfil the condition: Dc≤Df.

3. The cutting blade (20, 20', 20") according to claim 1, wherein:
the first blade bore (72a) comprises a first bore double-ended cone (74a) tapering away from the first and second blade side surfaces (22, 24) toward the first symmetry plane (S1).

4. The cutting blade (20, 20', 20") according to claim 1, wherein:
at the blade fastening portion (70), the cutting blade (20, 20', 20") further comprises:
a second blade bore (72b) located forwardly of the first blade bore (72a) and opening out to the first and second blade side surfaces (22, 24), the second blade bore (72b) having a second bore double-ended cone (74b) tapering away from the first and second blade side surfaces (22, 24) toward the first symmetry plane (S1); and
a third blade bore (72c) located forwardly of the first blade bore (72a) and opening out to the first and second blade side surfaces (22, 24), the third blade bore (72c) having a third bore double-ended cone (74c) tapering away from the first and second blade side surfaces (22, 24) toward the first symmetry plane (S1);
the first, second and third bore double-ended cones (74a, 74b, 74c) exhibit mirror symmetry about the first symmetry plane (S1).

5. The cutting blade (20, 20', 20") according to claim 1, wherein:
the first and second peripheral blade abutment sub-surfaces (80a, 80b) exhibit mirror symmetry about the first and second symmetry planes (S1, S2).

6. The cutting blade (20, 20', 20") according to claim 5, wherein:
at the blade fastening portion (70), the cutting blade (20, 20', 20") exhibits mirror symmetry about the first and second symmetry planes (S1, S2).

7. The cutting blade (20, 20', 20") according to claim 1, wherein:
the first peripheral blade abutment sub-surface (80a) comprises a first blade prism (90a);
the second peripheral blade abutment sub-surface (80b) comprises a second blade prism (90b); and
the first and second blade prisms (90a, 90b) exhibit a mirror symmetric angle about the first and second symmetry planes (S1, S2).

8. The cutting blade (20") according to claim 1, wherein:
at the blade fastening portion (70), the blade peripheral surface (30) further comprises a rearward facing pair of blade stopper surfaces (38a, 38b) adjacent to the first and second peripheral blade abutment sub-surfaces (80a, 80b).

9. The cutting blade (20') according to claim 1, wherein:
at the blade fastening portion (70), the blade peripheral surface (30) further comprises:
third and fourth peripheral blade abutment sub-surfaces (80c, 80d) located on opposite sides of the second symmetry plane (S2) and converging in the rearward blade direction (Rb) at a second taper angle ($\beta 2$), the first and third abutment sub-surfaces (80a, 80c) being on the same side of the second symmetry plane (S2) and the second and fourth abutment sub-surfaces (80b, 80d) being on the same side of the second symmetry plane (S2);
a first blade transition surface (86a) located between the first and third peripheral blade abutment sub-surfaces (80a, 80c); and
a second blade transition surface (86b) located between the second and fourth peripheral blade abutment sub-surfaces (80b, 80d).

10. The cutting blade (20, 20', 20") according to claim 1, wherein:
the first taper angle $\beta 1$ satisfies the following condition: $10° \leq \beta 1 \leq 80°$.

11. The cutting blade (20, 20', 20") according to claim 10, wherein:
the first taper angle $\beta 1$ further satisfies the following condition: $20° \leq \beta 1 \leq 60°$.

12. The cutting blade (20, 20', 20") according to claim 10, wherein:
the first taper angle $\beta 1$ further satisfies the following condition: $25° \leq \beta 1 \leq 40°$.

13. The cutting blade (20, 20', 20") according to claim 1, wherein:
at the blade fastening portion (70), the cutting blade (20, 20', 20") further comprises:
a second blade bore (72b) located forwardly of the first blade bore (72a) and opening out to the first and second blade side surfaces (22, 24); and
a third blade bore (72c) located forwardly of the first blade bore (72a) and opening out to the first and second blade side surfaces (22, 24); and
in a side view of the cutting blade, the first, second and third blade bores (72a, 72b, 72c) exhibit mirror symmetry about the second symmetry plane (S2).

14. A tool holder (100, 100', 100") extending along a holder longitudinal axis (H) defining opposite forward and rearward holder directions (Fh, Rh);
the tool holder (100, 100', 100") having a holder symmetry plane (Sh2) containing the holder longitudinal axis (H);
the tool holder (100, 100', 100") comprising:
opposing upper and lower holder surfaces (102, 104) extending along, and on opposite sides of the holder symmetry plane (Sh2);
opposing first and second side holder surfaces (106, 108) extending along the holder longitudinal axis (H) and connecting the upper and lower holder surfaces (102, 104);
a front holder surface (110) connecting the upper and lower holder surfaces (102, 104) and the first and second side holder surfaces (106, 108); and
a blade pocket (120) recessed in the first side holder surface (106) and opening out to the front holder surface (110);
the blade pocket (120) comprising:
a pocket base abutment surface (122) transverse to the holder symmetry plane (Sh2);
a first holder bore (124a) opening out to the pocket base abutment surface (122); and
a pocket peripheral surface (128) extending from the pocket base abutment surface (122) towards the first side holder surface (106) and comprising:
first and second pocket abutment walls (130a, 130b) located on opposite sides of the holder symmetry plane (Sh2) and converging in the rearward holder direction (Rh) at a first holder taper angle ($\gamma 1$);
wherein
the first and second pocket abutment walls (130a, 130b) exhibit a mirror symmetric angle about the holder symmetry plane (Sh2), with the first holder taper angle ($\gamma 1$) satisfying the following condition: $25° \leq \gamma 1 \leq 40°$; and
the upper and lower holder surfaces (102, 104) exhibit a mirror symmetric angle about the holder symmetry plane (Sh2).

15. The tool holder (100, 100', 100") according to claim 14, wherein:
the tool holder (100, 100', 100") exhibits mirror symmetry about the holder symmetry plane (Sh2).

16. The tool holder (100') according to claim 14, wherein:
the pocket peripheral surface (128) further comprises:
third and fourth pocket abutment walls (130c, 130d) located on opposite sides of the holder symmetry plane (Sh2) and converging in the rearward holder direction (Rh);
a first holder transition surface (136a) located between the first and third pocket abutment walls (130a, 130c); and
a second holder transition surface (136b) located between the second and fourth pocket abutment walls (130b, 130d).

17. The tool holder (100, 100', 100") according to claim 14, wherein:
the blade pocket (120) further comprises:
a second holder bore (124b) located forwardly of the first holder bore (124a) and opening out to the pocket base abutment surface (122); and
a third holder bore (124c) located forwardly of the first holder bore (124a) and opening out to the pocket base abutment surface (122); and
in a side view of the tool holder, the first, second and third holder bores (124a, 124b, 124c) exhibit mirror symmetry about the holder symmetry plane (Sh2).

18. A cutting tool (1, 1', 1") comprising:
a tool holder (100, 100', 100") extending along a holder longitudinal axis (H) defining opposite forward and rearward holder directions (Fh, Rh), the tool holder having a holder symmetry plane (Sh2) containing the holder longitudinal axis (H), the tool holder comprising:
- opposing upper and lower holder surfaces (102, 104) extending along, and on opposite sides of the holder symmetry plane (Sh2);
- opposing first and second side holder surfaces (106, 108) extending along the holder longitudinal axis (H) and connecting the upper and lower holder surfaces (102, 104);
- a front holder surface (110) connecting the upper and lower holder surfaces (102, 104) and the first and second side holder surfaces (106, 108); and
- a blade pocket (120) recessed in the first side holder surface (106) and opening out to the front holder surface (110);

the blade pocket (120) comprising:
- a pocket base abutment surface (122) transverse to the holder symmetry plane (Sh2);
- a first holder bore (124a) opening out to the pocket base abutment surface (122); and
- a pocket peripheral surface (128) extending from the pocket base abutment surface (122) towards the first side holder surface (106) and comprising:
  - first and second pocket abutment walls (130a, 130b) located on opposite sides of the holder symmetry plane (Sh2) and converging in the rearward holder direction (Rh);

wherein
the first and second pocket abutment walls (130a, 130b) exhibit a mirror symmetric angle about the holder symmetry plane (Sh2); and
the upper and lower holder surfaces (102, 104) exhibit a mirror symmetric angle about the holder symmetry plane (Sh2);

a cutting blade (20, 20', 20") extending along a central blade axis (L) defining opposite forward and rearward blade directions (Fb, Rb), the cutting blade having first and second symmetry planes (S1, S2) perpendicular to one another, each containing the central blade axis (L), the cutting blade comprising:
- opposite first and second blade side surfaces (22, 24) extending along, and on opposite sides of, the first symmetry plane (S1);
- a blade peripheral surface (30) connecting the first and second blade side surfaces (22, 24);
- a blade cutting portion (50) comprising a first insert seat (62); and
- a blade fastening portion (70) extending from the blade cutting portion (50) in the rearward blade direction (Rb);

the blade peripheral surface (30) comprising:
- opposite top and bottom blade surfaces (32, 34) extending along, and on opposite sides of, the second symmetry plane (S2);
- a forwardly facing forward blade surface (36) extending between the top and bottom blade surfaces (32, 34); and
- a rearward blade end (42) opposite the forward blade surface (36);

at the blade fastening portion (70):
the top blade surface (32) comprises a first peripheral blade abutment sub-surface (80a);
the bottom blade surface (34) comprises a second peripheral blade abutment sub-surface (80b);
the first and second blade side surfaces (22, 24) comprise, respectively, first and second blade side abutment sub-surfaces (82, 84); and
a first blade bore (72a) opens out to the first and second blade side abutment sub-surfaces (82, 84);

wherein:
the first and second peripheral blade abutment sub-surfaces (80a, 80b) converge in the rearward blade direction (Rb) at a first taper angle β1 and exhibit a mirror symmetric angle about the first and second symmetry planes (S1, S2);

a fastening member (144); and
a cutting insert (60) releasably secured to the first insert seat (62) of the cutting blade (20, 20', 20");

wherein:
the cutting blade (20, 20', 20") is releasably secured to the tool holder (100, 100', 100") by the fastening member (144) passing through the first blade bore (72a) and engaging the first holder bore (124a);
the mirror symmetric angles of the cutting blade (20, 20', 20") and the tool holder (100, 100', 100") are configured to facilitate the cutting blade (20, 20', 20") to be secured to the tool holder (100, 100', 100") in both of the following two configurations, namely:
a first configuration where the second blade side abutment sub-surface (84) abuts the pocket base abutment surface (122) and the first and second peripheral blade abutment sub-surfaces (80a, 80b) respectively abut the first and second pocket abutment walls (130a, 130b); and
a second configuration where the first blade side abutment sub-surface (82) abuts the pocket base abutment surface (122) and the first and second peripheral blade abutment sub-surfaces (80a, 80b) respectively abut the second and first pocket abutment walls (130b, 130a).

19. The cutting tool (1, 1', 1") according to claim 18, wherein:
the first blade side surface (22) and second blade side surfaces (24) are flush, or recessed relative to, the first side holder surface (106) in a direction perpendicular to the first symmetry plane (S1).

20. The cutting tool (1, 1', 1") according to claim 18, wherein:
at the blade fastening portion (70), the cutting blade (20, 20', 20") further comprises:
- a second blade bore (72b) located forwardly of the first blade bore (72a) and opening out to the first and second blade side surfaces (22, 24); and
- a third blade bore (72c) located forwardly of the first blade bore (72a) and opening out to the first and second blade side surfaces (22, 24);

the blade pocket (120) further comprises:
- a second holder bore (124b) located forwardly of the first holder bore (124a); and
- a third holder bore (124c) located forwardly of the first holder bore (124a);

the first, second and third blade bores (72a, 72b, 72c) exhibit mirror symmetry about the second symmetry plane (S2); and
the first, second and third holder bores (124a, 124b, 124c) exhibit mirror symmetry about the holder symmetry plane (Sh2).

21. The cutting tool (1") according to claim 18, wherein:
- at the blade fastening portion (70), the blade peripheral surface (30) further comprises a rearward facing pair of blade stopper surfaces (38a, 38b) adjacent to the first and second peripheral blade abutment sub-surfaces (80a,80b);
- the blade pocket (120) further comprises a forwardly facing pair of holder stopper surfaces (138a, 138b) adjacent to the first and second pocket abutment walls (130a, 130b); and
- the pair of blade stopper surfaces (38a, 38b) abut against the pair of holder stopper surfaces (138a, 138b).

\* \* \* \* \*